(12) United States Patent
Dargusch et al.

(10) Patent No.: US 7,906,163 B2
(45) Date of Patent: Mar. 15, 2011

(54) METHOD FOR APPLYING PARTICULATE COATING TO FOOD PRODUCTS

(75) Inventors: Adam Gary Dargusch, Everton Park (AU); Paul Francis Heness, Brassall (AU); Christopher Gorton, Upper Mount Gravatt (AU); John Macrae Silvester, Carina (AU)

(73) Assignee: Heat and Control Inc., Hayward, CA (US)

( * ) Notice: Subject to any disclaimer, the term of this patent is extended or adjusted under 35 U.S.C. 154(b) by 695 days.

(21) Appl. No.: 11/488,282

(22) Filed: Jul. 17, 2006

(65) Prior Publication Data

US 2008/0014310 A1    Jan. 17, 2008

(51) Int. Cl.
*A23P 1/08*    (2006.01)
*B05C 5/00*    (2006.01)
(52) U.S. Cl. .......................... 426/289; 118/24
(58) Field of Classification Search .............. 426/289
See application file for complete search history.

(56) References Cited

U.S. PATENT DOCUMENTS

| 3,036,533 | A | * | 5/1962 | Burt et al. ................. 426/294 |
| 3,615,645 | A | * | 10/1971 | Forkner ..................... 426/578 |
| 4,961,940 | A | * | 10/1990 | Hansson ..................... 426/89 |
| 5,643,361 | A | * | 7/1997 | Wadell ........................ 118/16 |
| 5,794,757 | A | * | 8/1998 | Svejkovsky et al. ....... 198/750.8 |
| 6,183,792 | B1 | * | 2/2001 | Bettcher et al. ............ 426/289 |
| 6,415,911 | B1 | * | 7/2002 | Svejkovksy et al. ....... 198/750.1 |

* cited by examiner

*Primary Examiner* — Carolyn A Paden
(74) *Attorney, Agent, or Firm* — Law Offices of Donald N. MacIntosh

(57) ABSTRACT

A belt less applicator of particulate materials for food products includes a differential impulse linear conveyor having a horizontal pan carrying a bed of particulate materials and food products spaced there along. Particulate materials are supplied from above to coat the food products as the pan conveys the products to a subsequent treatment station. Hammer like tamping contact of the products insures good adhesion of the coatings to the products. The excess particulate materials are recycled and the entrained dough balls removed as the products are discharged.

2 Claims, 6 Drawing Sheets

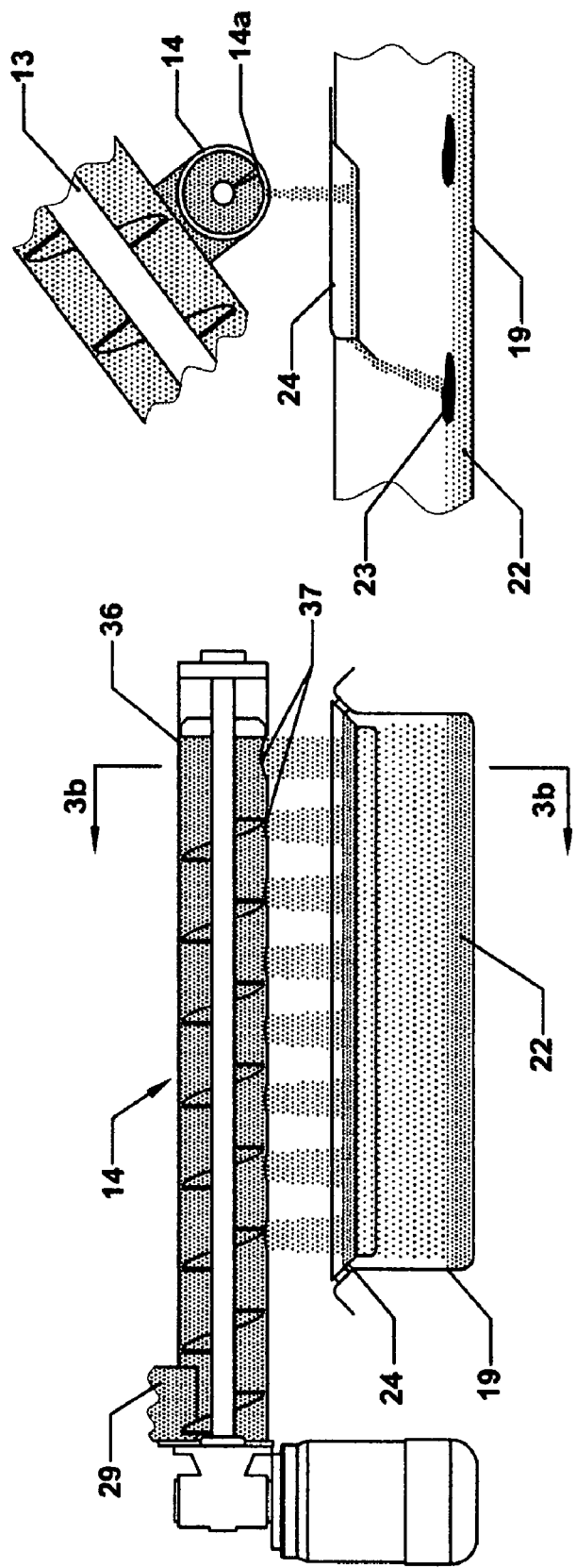

METHOD FOR APPLYING PARTICULATE COATING TO FOOD PRODUCTS

FIELD OF THE INVENTION

This invention relates to a method in which a food product is first treated with a coating such as flour or batter and then covered with a particulate coating such as bread crumbs in a process known in the field as "breading" the application machinery being known as "breaders" and more specifically concerns breading without the use of conveyor belts, hence, "belt-less breaders."

BACKGROUND OF THE INVENTION AND THE PRIOR ART

By the way of background, in the food processing industry breadings are commonly applied to food products before cooking in an oven or fryer. The breadings are generally cereal/grain based, typically thermally processed, ground coatings which may contain seasonings. Usually, a liquid batter is applied to the food product before breading and in many applications pre-dusting with flour or the like is a first step of a coating process before batter is applied to the food products. Pre-dusting may also be an intermediate step in more complex breading processes, examples: batter followed by breading; pre-dusting followed by batter coating followed by breading; and batter followed by breading, followed by pre dusting and again batter and again breading. "Pre-dust" material is typically flour, commonly wheat or corn flour or a blend of the two and is considered a particulate coating. Some breading machines are able to handle both free flowing bread crumbs and non free flowing flour used for pre dusting while on the other hand machines may be dedicated to one or the other type of coatings. The belt-less breader of the present invention, using quick change horizontal augers, handles both. The use of pre-dusting and batter is to ensure good breading pick-up and coverage of the products' surfaces. Breadings are used to enhance food products by supplying texture, flavor, color, appearance and target weight. The economic value of the products are measurably increased from the breading treatment.

Over the past many decades and presently, except where drum type breaders were used to tumble typically small product piece sizes (for example: shrimp) which can be handled in bulk, the breading equipment employed though out the food processing industry relied upon conveyor belts on which the products were carried. The products rested upon a 'bed' of breading material also carried by the belts. As they were being conveyed, in certain instances, the products often were tumbled or rolled on the conveyor belts to improve coverage of the top and bottom products' surfaces, especially for difficult, oddly shaped products In some instances mounted over the principal conveyor were overhead breading distribution belts. These were employed to supply additional breading materials to the products as well as to the bed of breading materials. Rollers or additional top belts positioned above the main conveyor belts contacted the products to set the breading on the products surfaces and in this manner achieve the desired breading particle adhesion on the food products. Once the products had traversed the prior art breaders the excess breading materials were shaken or blown off from the products and the breading materials were recycled. The breading beds carried by the conveyor belts were also recycled. Dough balls were also removed and segregated. These were formed naturally as clusters from the breading, batter and product juices coming together during the breading process.

The required clean up and maintenance costs of breading equipment employing belts can be quite substantial and a significant burden to the plant operator. Conveyor belts are prone to deformation, jamming, tearing and stretching and other forms of malfunction or failure during their operational lives. Furthermore, breader conveyor belts, their running surfaces, associated sprockets and drives are difficult and time consuming to clean as required by governmental sanitation standards. These parts are costly to replace and their replacement results in expensive down time for the processing plant. Moreover, conveyor belts may also contribute to degradation of the crumb due to the grinding action between the moving belts and non-moving elements such as belt supports Many food products differing in shapes, sizes, textures and weights have been successfully treated with batter and breading. For example, consider vegetables, fresh meats and poultry in varying shapes and moisture content as well as formed chicken patties, and nuggets that are common in the market place. Cut fish products and extruded fish products as well as precooked bone-in chicken or ravioli are all good candidates for treatment by breading. Of course this list is not all inclusive but is an example of the range of food products that are enhanced when passing through the breading process. The present inventions disclosed herein, an improved breading process and a belt-less breader that enables the process, handle these food products very well and in an overall more efficient, economical and improved manner than does the prior art. This contrasts with belt-type breaders that are known to require frequent belt adjustments sometimes daily or more often.

There are a number of food products that can be more efficiently handled in the processing line when the products move in a defined pattern such as in a straight line or other pattern from station to station including a breader. This has benefits in the handling of the products.

The invention disclosed herein includes a belt-less conveyor of the differential impulse horizontal motion type. Conveyors of this construction are disclosed in the following U.S. Pat. No.: 5,351,807 Drive mechanism for a linear motion conveyor; U.S. Pat. No. 5,699,897 Drive mechanism for a linear motion conveyor; U.S. Pat. No. 5,794,757 Differential impulse conveyor and method; U.S. Pat. No. 6,079,548 Differential impulse conveyor and method; U.S. Pat. No. 6,216,850 Cyclically powered conveyor with flow leveler and U.S. Pat. No. 6,588,363 Seasoning system and method.

In a broader context these conveyors are sometimes categorized as cyclically powered tray conveyors, a category that also includes vibratory conveyors. However for breading applications it has been shown that differential impulse conveyors are much superior to vibratory conveyors primarily because in differential impulse conveyors the tray motion maintains the integrity of the breading mixture and avoids particle segregation. In contrast, with vibratory conveyors the breading mixture on the vibratory table stratifies rapidly with fine particles migrating downwards and the larger particles rising to the top. The end result over time is a non-uniform coating appearance and ultimate wastage of breading since the fines must then be removed and discarded from the system instead of adhering to the product being treated. A vibratory conveyor typically may have a tray stroke between 1.5 mm and 12 mm with the longer strokes operating at lower frequencies. The tray imparts an upward and forward motion to the products on the tray but when the tray returns to its original position the products are out of contact with the tray. This is undesirable with fragile breaded products for the reason that the vibratory motion tends to shake the coatings from the food products. Overall a large objection to using vibratory conveyors in breading applications is the segregation of the crumb and build-up of crumb and coating on the tray. An exemplary vibratory conveyor is disclosed in U.S. Pat. No. 5,211,277. A differential impulse horizontal motion conveyor has the valued advantage that the tray is largely self cleaning owing to the wiping action of the breading movement along the pan. This does not occur on a vibratory conveyor tray and there is often build-up of batter and wet breading material which adheres to the tray.

SUMMARY OF THE INVENTION AND OBJECTS

In summary the invention resides in a process of breading a food product including the steps of providing a conveyor of the differential impulse type that includes an horizontal pan or tray driven in a cycle to move in a forward direction at one speed and in a rearward direction at a quicker speed there being a null at the change of pan direction. Providing on the horizontal pan a bed of breading material for application to the food product. Placing the food product on the bed of breading and operating the conveyor in a plurality of cycles such that the product and the breading move progressively in the forward direction toward a transfer station. And supplying breading material from above the tray to the product and pan at the pan movement speeds. Contacting the product from above when there is no relative motion between the product and pan to set the breading on the product and retrieving from the pan and the product the excess breading and recycling the breading for reuse in the method.

In another aspect the invention resides in an improved breader apparatus comprising a differential impulse conveyor including a conveying pan operatively driven at a first speed in a forward conveying direction and at a second faster speed in a rearward direction including means for supplying a bed of breading material to said pan; and an overhead breading supply means serving to deliver breading to products carried on said pan and to said bed of breading material. Product tamping means are operative in synchronization to the movements of the pan serving to contact the products from above only when there is no relative motion between the pan and product so as to set the breading upon the product surfaces. Breading material gathering and recycling means serve to receive breading moved to the forward end of the pan and act to re-supply the overhead supply means. The gathering and recycling means is equipped to remove dough-balls and food particles from the recycled breading.

An important object of the invention is to provide a belt-less breader apparatus that transports and efficiently applies breading materials to food products in a manner that minimally disturbs the breading particles adhered to the food products.

Another object of the invention is to provide an improved method for applying breading materials to food products that during the application process enables the products to be oriented in a desired pattern and to maintain that pattern through out the process.

Yet another object is to apply the principles of differential impulse conveyance to the application of breading materials to food products.

Still another object is to provide an improved apparatus operative as a differential impulse conveyor including means for tamping the breaded products to ensure good adherence of the breading to the food products.

The above and additional objects and features of the invention will appear from the following specification in which a preferred embodiment has been set forth in detail and illustrated in the accompanying drawings.

BRIEF DESCRIPTION OF THE DRAWINGS

FIG. 2c is a view showing the discharge chute of the auger of FIG. 2a;

FIG. 3a is a fragmentary view of the upper or overhead supply auger and drive motor taken in the direction of the arrows 3a-3a in FIG. 1;

FIG. 3b is a fragmentary view taken in the direction of the arrows 3b-3b in FIG. 3a;

DESCRIPTION OF THE PREFERRED EMBODIMENTS

Figure 1:
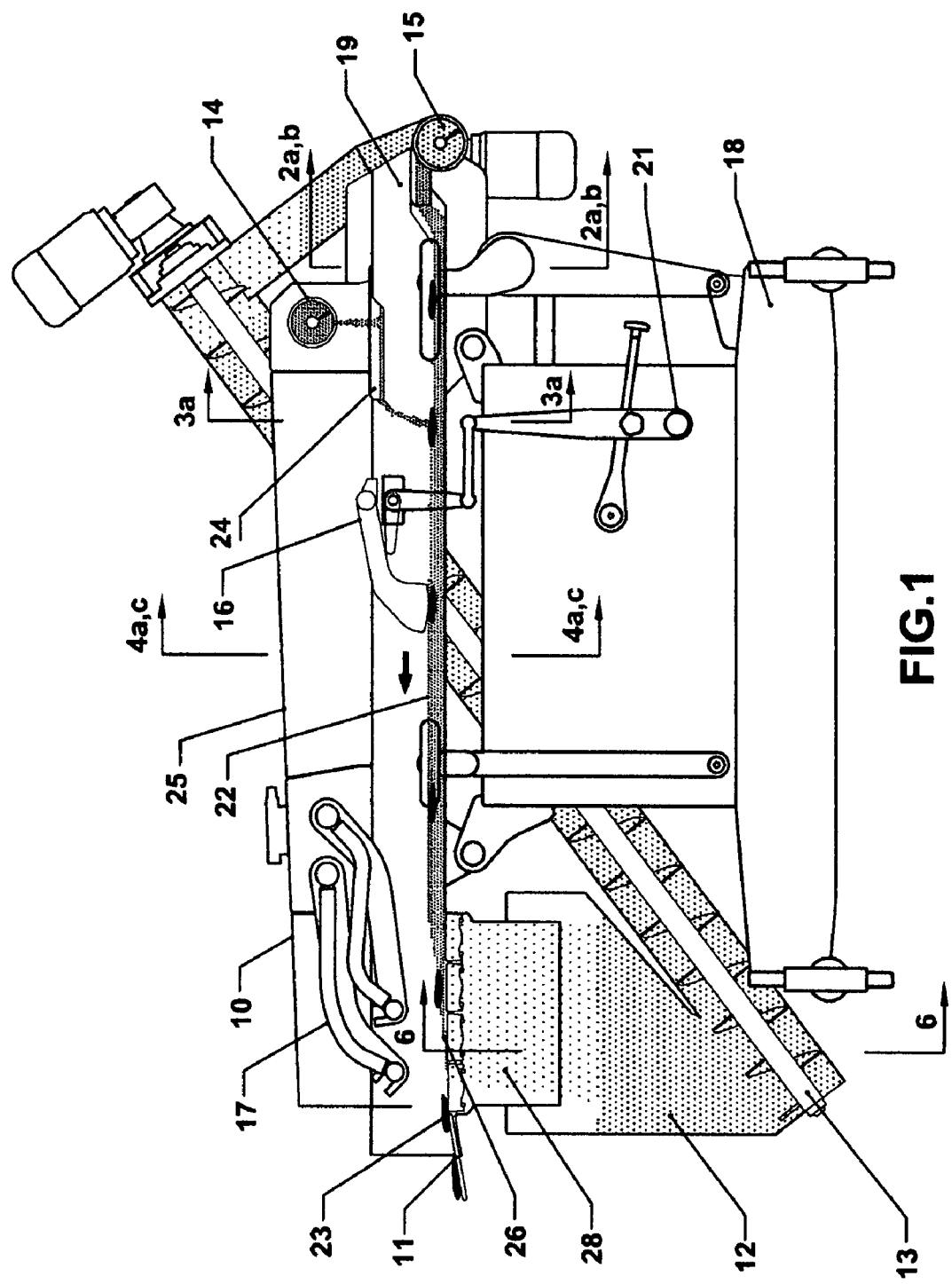
FIG. 1 is a longitudinal sectional view showing the belt-less breading apparatus of the present invention.
Figure 2A:
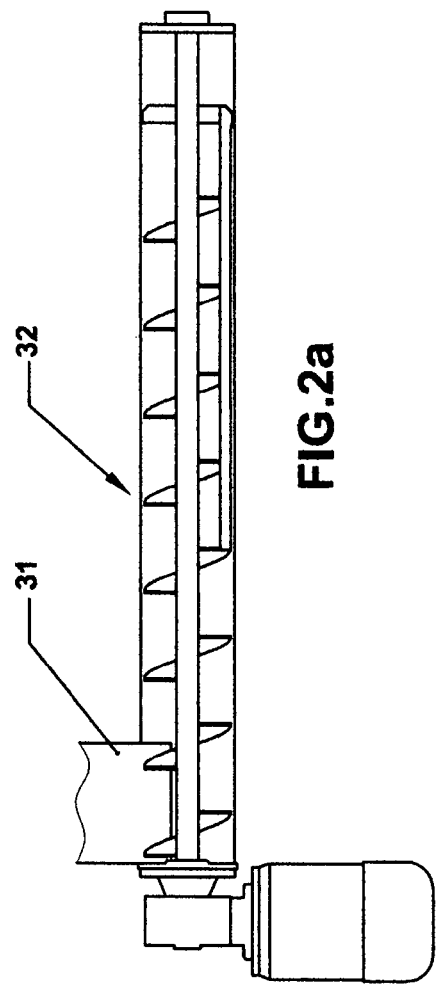
FIG. 2a is a fragmentary view showing details of the lower or bed supply auger and drive motor taken in the direction of the arrows 2a-2a in FIG. 1.
Figure 2B:
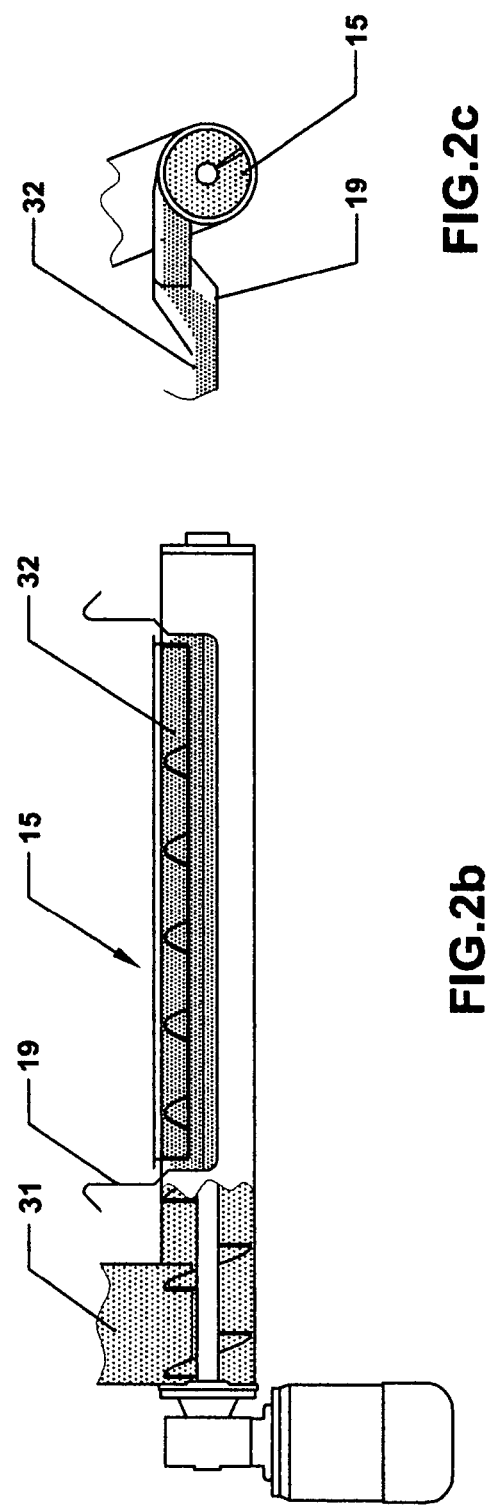
FIG. 2b is a general cross-section view of the bed supply auger taken in the direction of the arrows 2b-2b in FIG. 1.
Figure 2C:
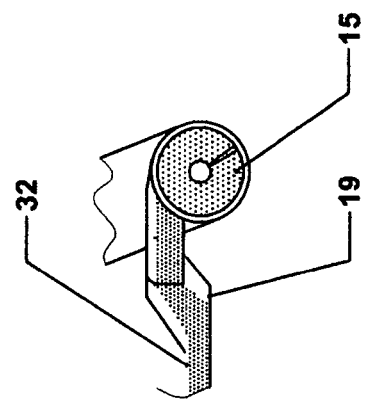
Figure 4A:
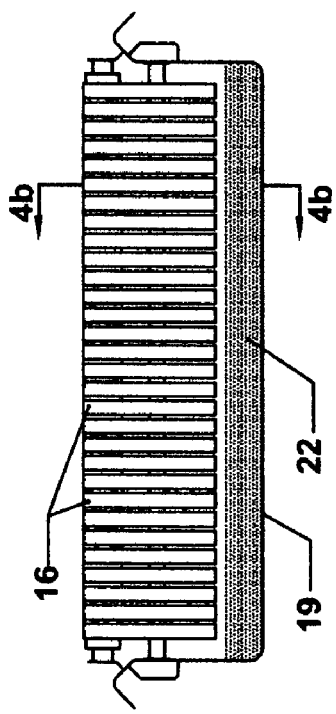
FIGS. 4a and 4c are fragmentary, transverse sectional views taken in the direction of the arrows 4a, 4c-4a, 4c in FIG. 1.
Figure 4B:
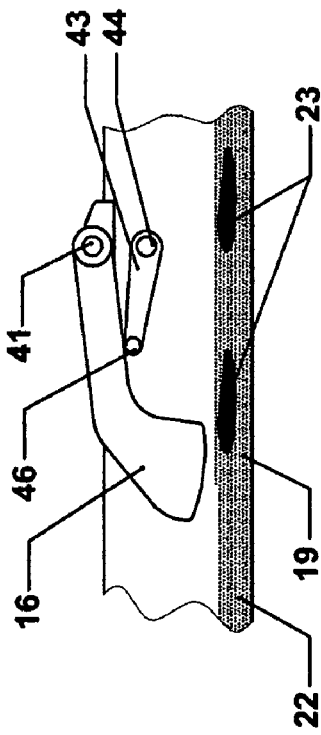
FIGS. 4b and 4d are fragmentary, longitudinal sectional views taken respectively in the direction of the arrows 4b-4b and 4d-4d in FIGS. 4a and 4b.
Figure 4C:
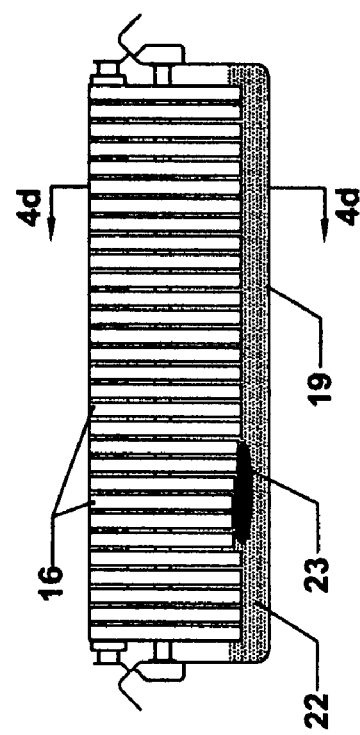
Figure 4D:
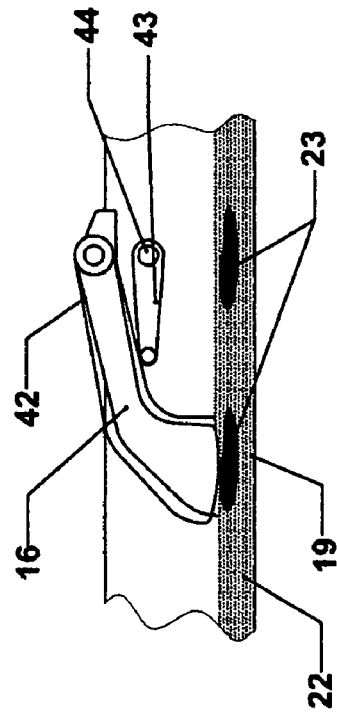

An improved breader apparatus 10, equipped to perform the breading method of the present invention, is shown in the drawings and referring particularly to FIG. 1 comprises in general a differential impulse horizontal motion linear conveyor 11, a main breading hopper 12, a main auger 13, a top auger 14, a bottom auger 15, a set of tamping hammers 16, an array of "air knives" 17 all arranged upon and supported by a frame 18.

The differential impulse linear conveyor 11 is preferably constructed in accordance with the teachings of the US Patents listed in paragraph 0007 above and these are incorporated in and made a part of this disclosure. The conveyor 11 provides horizontal motion to objects placed on the conveyor's main pan 19 which is coupled to a drive and controller 21 in a manner that enables a slow forward fast back motion due to the mechanism of the drive (not shown) and the means coupling the drive to the main pan 19, all as disclosed and claimed in the patents listed above in paragraph 0007. The resulting motion of contents within the pan 19 is termed horizontal motion. This motion is characterized by a relatively slow forward movement of the pan and its contents, during which the contents move with the pan, followed by relatively fast rearward movement of the pan during which the pan moves backward and its contents stay static relative to a fixed frame of reference.

A bed of breading 22 disposed on the pan 19 comprises a relatively thin layer of selected breading or particulate material. A food product 23 which may sometimes be coated with a batter is placed on the bed 22 so as to supply the bottom coating on the product 23. The bed is moved forward by the horizontal motion of the conveyor pan 19 and the product 23 travels with the bed, the bed 22 acting as a carrier for the product.

So as to supply a top coating to the food product 23 an intermediate pan 24 is mounted for movement with the main pan 19, and is disposed above the bed 22, FIGS. 1 and 3a. The top auger 14 discharges a continuous flow of breading onto the intermediate pan 24, which in turn discharges a curtain of breading onto the food product 23 and bed 22 below in response to the differential impulses of the conveyor 11. The curtain, which flows at a controlled rate, acts to coat the top surface of the food product such that the product is fully coated top and bottom.

Subsequent to the distribution of breading onto the product from the intermediate pan 24, there occurs compressing or tamping the bread covering on the food product by the tamping hammers 16. This is an important operation so as to establish good adhesion of breading to the product and breading "pick up." Thereafter the combined breading bed and product moves over a set of screens 26, solidly attached to the pan 19 and disposed below the air knives 17. Working together, the screens 26 and air knives 17 blowing downwardly perform a function known in the industry as "decrumbing". Here the excess coating is stripped away from the top and bottom of the product 23, dropped into the main breading hopper 12 for recycling and reuse. Dough balls or breading balls 27 formed as clusters of breading and batter materials fall through the screens 26 into a combined screen and dough ball hopper 28, FIGS. 1 and 5. The reclaimed breading falls initially through the screens 26 and then through the screen 28. The dough balls 27 are separated at this point and collected at the lowest point of the screen hopper 28 These are removed from the apparatus 10 as shown in FIG. 6. Hoods and covers 25 are arranged to enclose the apparatus 10 to protect the products and breading from contamination and to minimize spread of breading dust into the plant.

In general the distribution of the breading through belt-less breading system 10 is from a supply of breading in the hopper 12 from which the main auger 13 moves breading upwardly to a top discharge 29 to the top auger 14 which supplies breading to the intermediate pan 24 to establish the curtain of downward flowing breading onto the products and bed. A bottom discharge 31 receives breading from the auger 13 and emits breading to the bottom auger 18 which supplies breading to establish the bed 22 on the pan 19.

More specifically referring to FIGS. 1 and 2a-c, the main auger 14 withdraws breading from the hopper 12, moves it upwardly and into the discharge port 31 to supply the bottom auger 15. A laterally extending distribution opening 32 serves to permit the breading to exit the auger onto the pan 19 to establish the breading bed, as clearly shown in FIGS. 2b and 2c. It will be understood that the augers, their drive motors and discharge chutes are static and do not move with the pan 19.

FIGS. 1 and 3a-b show the top auger 14 and its relationship to the main auger 13, pan 19, intermediate pan 24, the food products 23 and the breading bed 22. The auger flights 33 rotate with a motor driven shaft 34 in a cylindrical housing 36 having bottom discharge openings 37 through which breading flows downwardly onto the intermediate pan 24. The main pan 19 and intermediate pan 24 move in unison. Among the important functions of the intermediate pan are: to reduce the vertical drop of the downward moving breading stream; to combine the discharge streams from the openings 37 into a uniform bed on the intermediate pan 24; and to time the fall of the curtain such that it falls on the product when there is relative motion between the product and the curtain of bread-ing. Further, this configuration provides additional space for depositing product on the bottom breading bed 22 and serves to keep the machine length compact. Alternatively the intermediate pan 24 could be provided with perforations or openings for creating a plurality of discrete top curtains or a "rain" like effect for particular breading applications. The intermediate pan 24 when provided with such perforations can be configured to screen out dough balls. Of course as the product 23 moves beneath the top curtain of flowing breading its top surfaces are coated and depending on the depth of the bed 22, may become buried in coating which aids in coverage of its vertical surfaces.

Compressing or tamping the breaded food product onto the bedding bed serves to improve adhesion of the breading to the surfaces of the product in order to produce a uniform coating. Tamping provides control of breading pick-up which is the percentage of the coating mass contained in the final coated product. Being able to control pick-up can be very important in a commercial breading operation and enables control of the finished product piece weight, taste and visual quality. In a belt-less breader system there is no need for compression rollers poised above moving conveyor belts.

In the belt-less breader apparatus 10 tamping is achieved by an array of individual hammers 16 mounted on a pivot shaft 41 extending laterally of the pan 19, as clearly shown in FIGS. 4a-d. A tamping hammer actuator drive 42 includes a spaced pair of arms 43 mounted on a pivot shaft 44, a rod 46 connects the arms 43. The pivot shaft 44 is driven such that it, together with the arms 43 rotate through a small angle, lifting the rod 46. This causes all hammers to lift as they pivot about the pivot shaft 41. The pivot shaft 44 is then driven rapidly back through the same angle to its starting point causing the hammers to fall under their own weight onto the combined breading bed and product. Because the hammers are individually articulated they each fall onto distinct surfaces of the products, shown best in FIGS. 4c-d. This configuration compensates for the wide variations in product shapes and spacing on the pan 19.

The actuator drive 42 is coupled to the differential impulse conveyor drive 21 and is carefully timed and matched to the movement of the main pan 19. The hammers 16 are lifted while there is relative motion of the product and breading bed on the pan and dropped while there is no relative motion of the product and breading bed on the pan 19. It will be understood that the described cycle of tamping or patting of the products repeats with each cycle of pan motion ensuring a thorough tamping of each and every product 23 as it passes beneath the hammers 16. In the prior art belt type breaders it was common for a compression action to produce belt markings in the product coatings and, in the case of non-uniform products, to cause poor uniformity of coating pick-up. The invention as disclosed herein with its tamping or hammering action and without a belt overcomes both problems.

Figure 5:
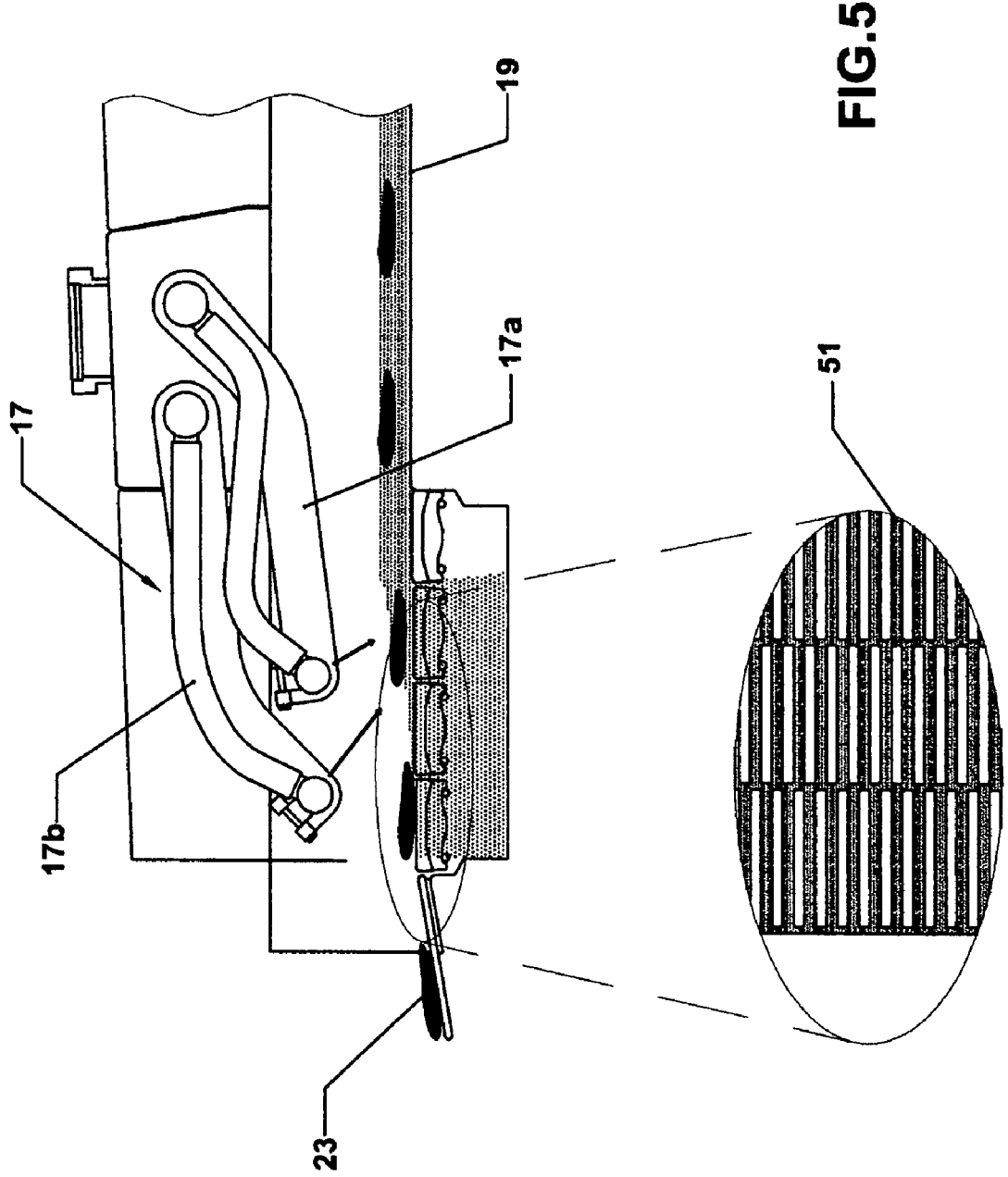
FIG. 5 is a combination fragmentary, longitudinal elevational view and a top view of the discharge section of the belt-less breading apparatus.
Figure 6:
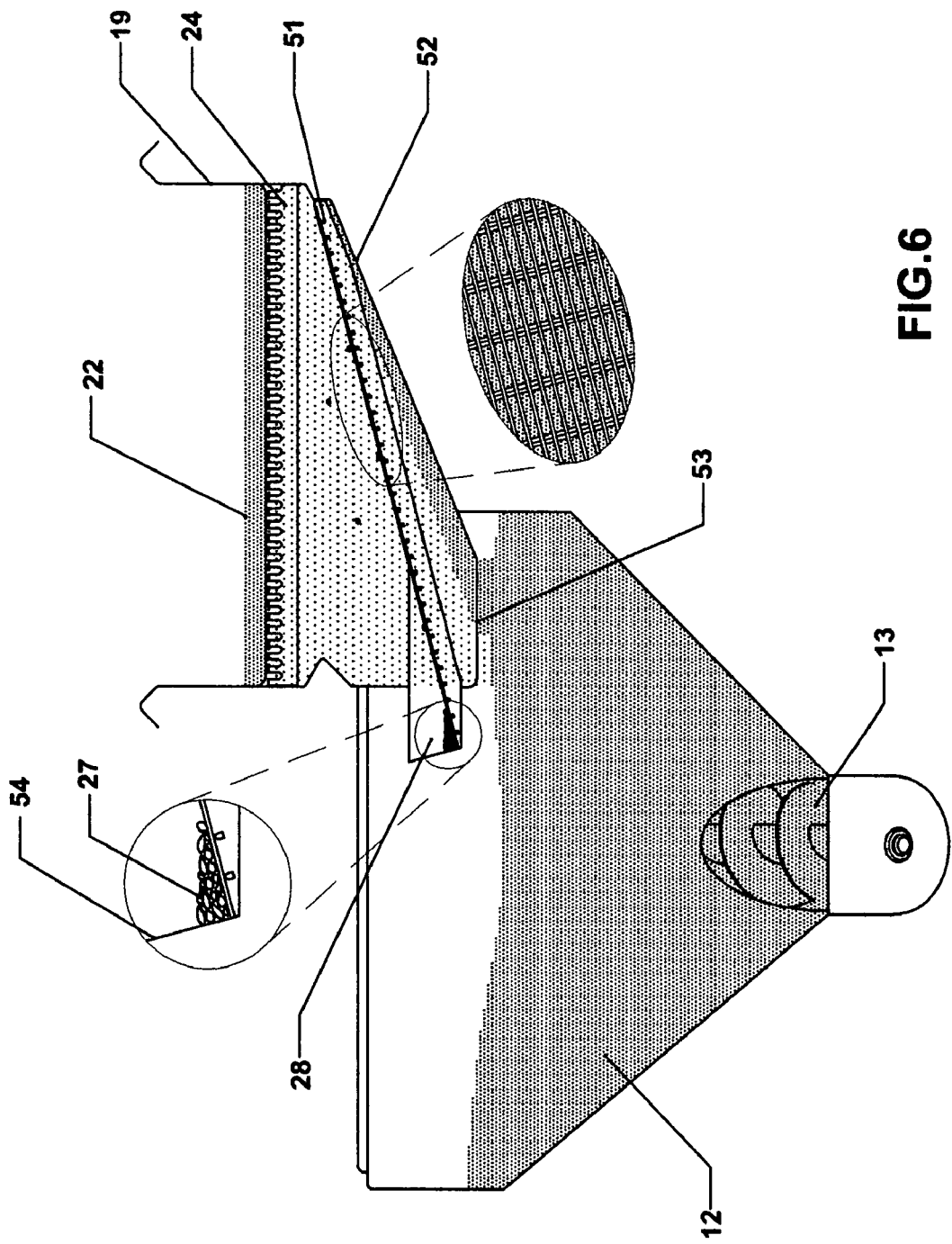
FIG. 6 is a fragmentary, transverse sectional view taken in the direction of the arrows 66 in FIG. 1 plus detail views showing the breading hopper, main auger and dough ball collection hopper.

The decrumbing step is shown in FIG. 5 and depicts the discharge end of the breader 10. The decrumbing operation is conducted with a plurality of screens 26 mounted with respect to the pan 19 so as to move with it. A plurality of air knives 17 are arranged above the screens which in turn are mounted above the static hopper 12. The configuration of the screens comprises screens 26 with alternating longitudinal shots and repeated full width transverse slots all for the purpose to allow breading to fall through into the main hopper 12 and to support the products. As the combined bed of breading and product reaches the screens 26, the breading beneath and around the product begins to fall through the slots. Both air knives 17a and b assist in removing excess coating from the top of the products. The screen slots serve to permit excess coating from the underside of the product to fall away freely through the laterally staggered pattern of openings in the screens.

Dough ball removal is shown in FIGS. 1 and 6 and is operative to comb the entire volume of breading in the apparatus 10 for dough ball removal. In the prior art breaders only a portion of the breading volume was passed through a removal system and consequently there remained a residual amount of dough balls in those breaders. A laterally inclined screen 51 disposed above a laterally inclined solid chute panel 52 are disposed as shown in FIG. 6. The screen 51 is composed of longitudinally extending spaced apart bars as illustrated in the oval view in FIG. 6. The bar spacing is dimensioned to enable breading to fall through while dough balls are held on the upper surface. The motion of the pan 19 transmitted to the screen 51 encourages breading to disperse through the gap and onto the inclined chute and into the hopper 12. The dough balls roll down the screen 51 to a collection zone 54 as illustrated in the circled view of FIG. 6. The dough balls may be removed manually from the collection zone 54.

EXAMPLES FROM USE OF THE METHOD

Example 1

Formed surimi rings (a Japanese style food product such as fish products made from inexpensive white fish and formed to resemble more expensive sea food products) were coated in the belt-less breader 10 with pre dust particulate material to enhance batter adhesion at a rate of over 1000 kg/hr. This operation produced a product uniformly coated on all surfaces for all portions. Product coverage was more uniform than those produced with the existing, belt-type pre dust machine. Portions were noted not to have any excess pre dust material coverage when exiting the machine 10.

Example 2

Whole fish fillets (skin-on and skin-off) were coated with pre dust particulate material in the apparatus 10 that delivered a product uniformly coated. On exiting the machine 10, no excess pre dust particulate material was noted on any of the products especially within the folds and crevices of the muscle structures. The coating was far superior to that produced by the prior art belt-type pre dust machine and assisted with the reduction of one labour point on the processing line.

Example 3

Formed surimi rings were pre dusted and battered and then coated, using the belt-less breader 10, with a Japanese style bread crumb (J-crumb) at a rate in excess of 1000 kg/hr. The product exiting the machine 10 was uniformly coated with crumb and still had the requisite highlight structures associated with this style of breading. There was no evident breading stratification on the portions and the coating on both top and bottom on the product was uniform and similar in appearance. Upon frying the product was indistinguishable from that produced by the prior art belt-type, special-purpose )-crumb breader.

Example 4

Shelled raw prawns were battered and delivered to the belt-less breader 10 to be coated in a fine powder type breading. The product exiting the machine was uniformly coated on all surfaces including the intact tail section. No coating voids were noted on any of the products being processed and when cooked, the final product when presented was typical of a powder type coated product.

Example 5

Battered and pre dusted whole fish fillets were presented to the belt-less breader 10 to be coated with a coarse Japanese style breading. Product exiting the breader was uniformly coated on all surfaces. Uniformity was superior to that obtained using the existing belt-type J-crumb breader.

The embodiments disclosed herein together with the examples of its use were chosen to best explain and describe the principles of the invention and its practical application to thereby enable any others skilled in the art to best utilize the invention in various embodiments and with various modifications as are suited to the particular use contemplated. It is intended that the scope of the invention be defined by the claims appended hereto.

What is claimed is:

1. In a system devoid of continuous belt conveyors, a method of applying a particulate coating to a food product including the steps of providing a conveyor of the differential impulse type that includes an horizontal pan driven in a cycle to move in a linear forward direction at one speed and in a linear rearward direction at a quicker speed such that in a portion of the cycle there is relative sliding motion between the pan and any material on the pan thereby to advance the material in the desired forward direction;

providing on the horizontal pan a bed of particulate material for application to the food product as a bottom coating;

placing the food product on the bed of particulate material and operating the conveyor in a plurality of cycles such that the product and the material move progressively in the forward direction to a transfer station;

providing a top coating by supplying particulate material from above to the product and pan only during that portion of the cycle during which there is relative motion between the pan and the food product;

retrieving from the pan and the product the excess material and recycling the material for reuse in the method.

2. The method of coating a food product as stated in claim 1 and further including the step of setting the coating on the product by contacting the product from above in a tamping hammer action.

* * * * *